May 15, 1945.  P. KRATZER  2,376,155
HYDRAULICALLY OPERATED HARDNESS TESTING APPARATUS
Filed July 17, 1942  2 Sheets-Sheet 1
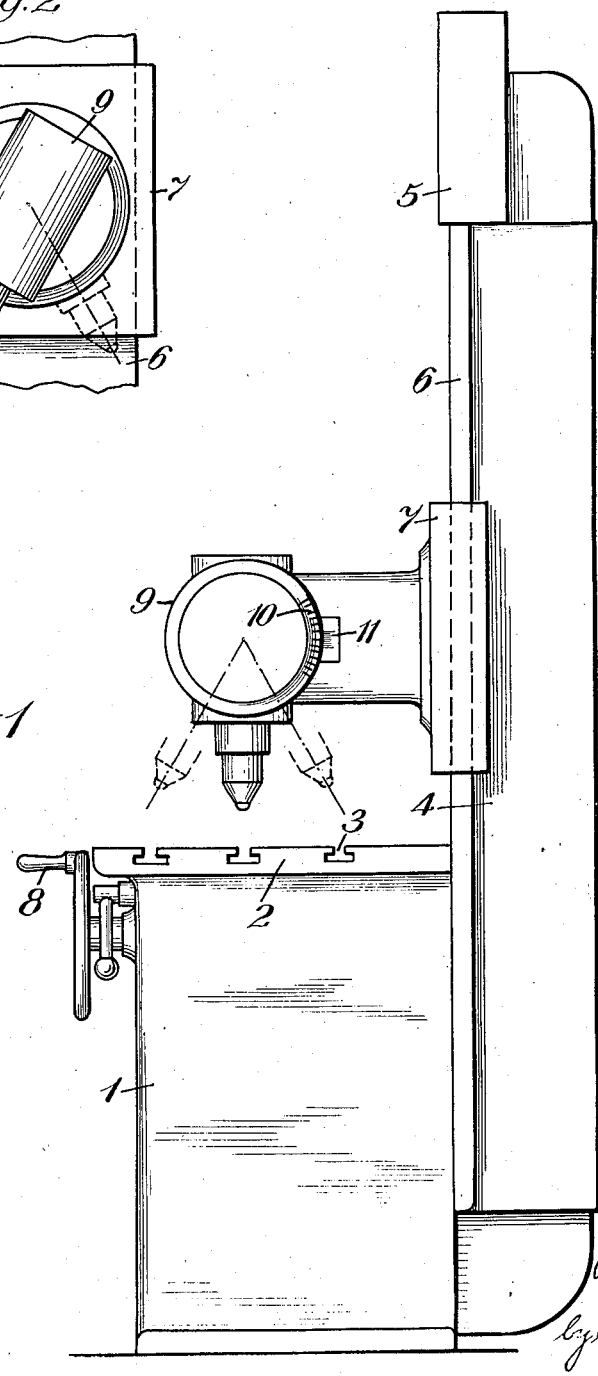
Inventor.
Paul Kratzer
by Sommers + Young
Attorneys

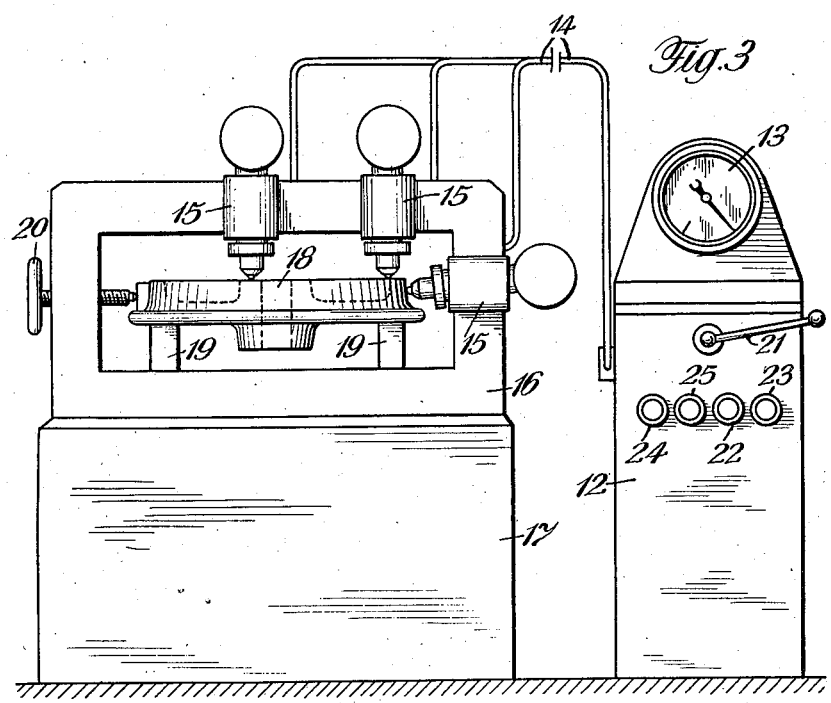
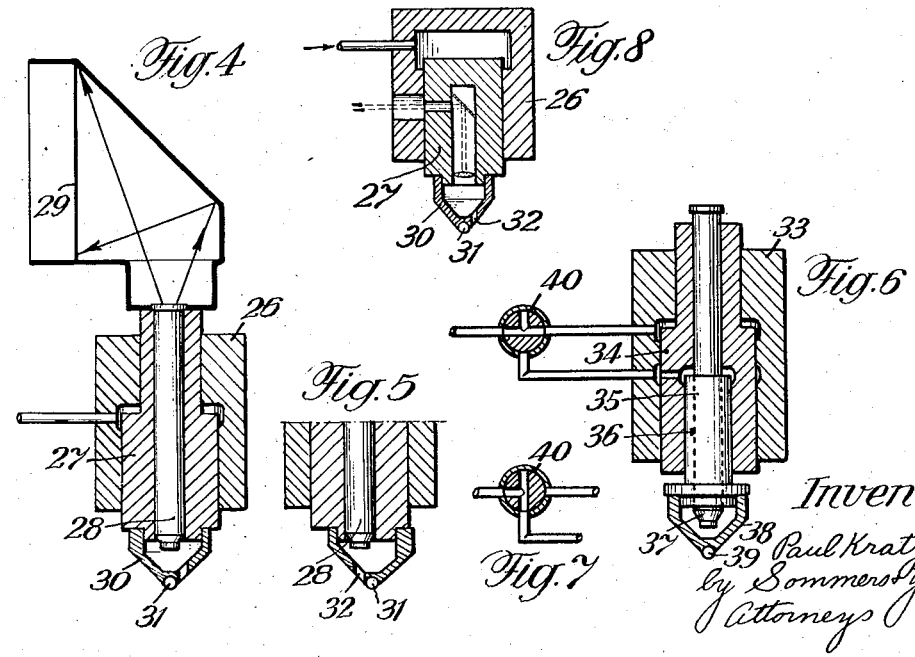

Patented May 15, 1945

2,376,155

UNITED STATES PATENT OFFICE 2,376,155

HYDRAULICALLY OPERATED HARDNESS TESTING APPARATUS

Paul Kratzer, Schaffhausen, Switzerland, assignor to Alfred J. Amsler & Co., Schaffhausen, Switzerland Application July 17, 1942, Serial No. 451,348
In Germany April 12, 1941

3 Claims. (Cl. 73—81)

This invention relates to hardness testing machines operating by means of hydraulic load application means.

Testing machines of this kind, that is, machines for testing the hardness of materials are existing in which the loading is applied in the manner of operation of a hydraulic press. In working on this principle the test loading which is adjustable to any desirable constant value is positively applied through a control slide valve or through valve means and is positively removed again after a certain time. The lower end of the plunger of the hydraulic cylinder is in the form of a press member for making an impression in the test piece the depth of which is then measured by means of a microscope, in a known manner.

The known machines for testing the hardness of materials of this kind have, however, the drawback that if the surface portion to be tested of the test piece is more or less inclined resort must be taken either to mating shims, that is, supporting blocks, or correspondingly tiltable work tables must be applied in order to obtain a perfectly satisfactory hardness test impression suitable for being measured. If test pieces having various inclined surfaces and requiring to be provided with hardness test impressions at different points it is still more difficult to come up to said requirement for the reason that in these circumstances either the supporting block or the work table must be rearranged for each hardness test impression.

Due to the requirement of such exchanging or readjusting of the supporting means, the testing operation is complicated and becomes time-consuming, particularly, if large test pieces or long series of test pieces are concerned.

The object of the invention is to eliminate said drawbacks by providing a hardness testing machine operating by means of hydraulic load application means but requiring neither supporting blocks nor a tiltable work table, even if the test piece be provided with an inclined surface portion extending at any angle of inclination to the work supporting means in order to obtain a perfect hardness testing impression suitable for being measured.

According to the invention, this result is obtained by adapting the press device of the hardness testing machine operating by means of hydraulic load application means to be adjusted into any desired angular position so that hardness test impressions can be made in surface portions of the test piece of any inclination.

The invention further provides for equipping one and the same hardness testing machine with as many unrestrictedly angularly adjustable hydraulic press devices that may be required for the purpose the machine is to serve and can jointly be actuated from a common control position.

In the accompanying drawings several embodiments of the invention are illustrated by way of example only in which Fig. 1 shows a side elevation of a hardness testing machine embodying the invention;

Fig. 2 is a front view of the press device of said machine;

Fig. 3 shows a front elevation of a hardness testing machine having three press devices;

Fig. 4 is an axial section of the plunger arrangement and associated intruding member of an individual hydraulic press device, the plunger being in the form of a differential piston provided with an optical system and an image projecting device;

Fig. 5 is a section similar to Fig. 4 with a part in a different position;

Fig. 6 is an axial section of a modified plunger arrangement of the hydraulic press device in which the plunger is composed of two telescopically interengaging axially bored differential pistons including a microscope;

Fig. 7 shows a pressure fluid control member of Fig. 6 in a different position, and Fig. 8 is an axial section of a hydraulic press device with a single hydraulic plunger having an axial part-bore communicating with a cross bore.

Referring to Fig. 1 the base of the hydraulic hardness testing machine is designated by 1. This base accommodates in its hollow interior a hydraulic pressure generator associated with a motor, a control slide valve, regulating valve means, and so forth. Said valve means may be of any suitable kind and need thus not be explicitly described or shown. The top of the base 1 serves as a work table 2 having undercut grooves 3 so that any test pieces cannot only be mounted on said table but can also be clampingly held in position.

On the upper portion of the standard 4 a load indicator, for example a Bourdon pressure gauge, is arranged for exhibiting the loading applied. The standard 4 has guides 6 for slidably guiding a slide 7. The latter can be adjusted in height as required by means of a handwheel 8 cooperating with a screw spindle. To the slide 7 a hydraulic press device 9 is fastened which can be tilted into any desired angular position in two planes longitudinally and transversely of the work table 2, dependent on the form of the test piece or sample, as shown in Figs. 1 and 2. An index 11 cooperating with a scale 10 permits the reading of the angular position of the press device in fractions of divisions of the scale. During the working the press device 9 is securely fastened to the slide 7 by means of a handle in any suitable manner, so that the press device, the standard and the base form together a rigid frame.

The hydraulic hardness testing machine shown in Fig. 3 is, by way of example, provided with three press devices and serves for testing the hardness of wheel tyres. In this hardness testing apparatus the hydraulic pressure generating device is separately arranged from the hardness testing machine itself. The numeral 12 refers to the control desk within the interior of which the pressure generating device consisting in a pump and an associated motor, inclusive of control means thereof, and so forth are housed. Said accessories are of any suitable kind and need thus not be described in detail. On the pressure gauge 13 the loading as adjusted can be read off.

The control desk 12 is connected with the hydraulic press devices 15 by separate pipings 14, the arrangement being such that the hydraulic pressure is uniform throughout all the press devices. Alternatively separate means may be provided for individually adjusting the hydraulic pressure to different values for producing different test loadings.

The press devices 15 are arranged on a frame 16 supported by the base 17 in accordance with the use into which said devices are put, in such manner, that the devices can each be shifted and tilted to any desired extent. The wheel tyre 18 to be tested is placed on blocks 19 and secured by means of a holding spindle 20. The press devices 15 are adjusted to the points of the frame 16 where impressions for the hardness testing are to be made and are clamped in position. The numeral 21 designates the common load application lever on the actuation of which all three press devices are jointly actuated for making the impressions. The individual press devices can be connected and disconnected independently of each other, at will, by means of valves 22, 23, so that only the press devices connected are controlled by the load application lever 21. The valve 24 serves for adjusting the velocity of loading and the valve 25 for adjusting the time during which the loading remains applied, in consequence whereof, the hardness testing machine operates wholly automatically when said valves are adjusted.

Figs. 4 and 5 each show an axial section of the plunger arrangement of the hydraulic press device, the numeral 26 representing a cylinder in which a plunger 27 is movably arranged free from friction. The plunger 27 is in the form of a bored differential piston and is thus adapted to accommodate the optical system of a microscope 28 in coaxial relation, the latter serving for measuring the hardness test impression in a usual manner. In this arrangement the bore of the plunger functions at the same time as a tube for the microscope.

If the hardness test impression has to be projected on to a frosted glass pane, so that the degree of hardness can be read off directly by means of scales, this result is obtained through the instrumentality of an image projecting device 29 which is fastened to the upper part of the hydraulic press device. The holder 30 of the intruding member 31 is arranged for eccentrical rotation through an angular range of 90° relative to the piston 27, so that either the intruding member or the bore 32 are adapted to be aligned with the axis of the microscope dependent upon the rotative position which the holder occupies. If the bore 32 is aligned the hardness test impression is given free so that, for the purposes of measuring, the impression is within the field of vision of the microscope, that is, the image projecting device (Fig. 5).

In Fig. 6 a second form of hydraulic press device including two plungers is shown, the first plunger being in the form of a differential piston accommodating, in coaxial relation therewith, a second bored differential piston the bore of which functions as a tube for the microscope also in this case. With this arrangement it is intended to put the hardness testing machine into use for working under large and small loadings dependent upon the proportion of the piston areas.

The cylinder of the hydraulic press device is designated by 33 and the first differential piston 34 reciprocates free from friction in the bore of said cylinder. The second differential piston 35 is telescopically connected with the first piston and moves in the latter also free from friction. In the bore 36 of the second piston the microscope 37 is arranged and to the lower portion of the piston 35 the movable holder 38 is secured together with the intruding member of the latter. The arrangement of the holder 38 is exactly like that described in connection with the example illustrated in Figs. 4 and 5.

In order to subject one or the other piston to the pressure fluid a change-over valve 40 is arranged. In Fig. 6 the setting of the change-over valve 40 is shown for giving passage to the pressure medium toward the first differential piston, whereas in Fig. 7 the setting of this valve for supplying the second differential piston is shown.

A distinctive advantage of the described arrangement resides in that the microscope and the image projecting device respectively form with the hydraulic press device a self-contained unit and can be tilted with said device into inclined positions of operation.

Mention may further be made of the possibility of employing a single plunger 26 being bored only over part of its length and having a cross-bore which is situated at a predetermined point and extends transversely of the cylinder also, where it forms a window in or behind which a microscope or an image projecting device may be arranged for the exploration of the hardness test impression.

I claim:

1. In a hardness testing machine operating by means of hydraulic load application means, an intruding member for impressing the materal to be tested, said material being mounted in testing position in said machine with the surface portion to be impressed extending at any desired angle of inclination within a limited range to the supporting means on which said material is mounted, a hydraulic press device arranged in said machine, and angularly adjustable at will within a limited range relative to said material, for actuating said intruding member and moving said member into juxtaposition to said surface to be tested, said press device including a plunger in the form of a bored differential piston, a microscope mounted in the bore of said piston and having a forward lens separate from the intruding member.

2. In a hardness testing machine operating by means of hydraulic load application means, an intruding member for impressing the material to be tested, said material being mounted in testing position in said machine with the surface portion to be impressed extending at any angle of inclination to the supporting means on which said material is mounted, a hydraulic press device arranged in said machine, and individually angularly adjustable relative to said material, for actuating said intruding member and moving said member into juxtaposition to said surface portion, said press device including a plunger in the form of two bored differential pistons telescopically interengaging with each other, a microscope associated with the inner of said telescopically interengaging differential pistons, the bore of said inner piston providing the tube for said microscope, and pressure fluid control means for actuating said press device for said intruding member to impress said material.

3. In a hardness testing machine operating by means of hydraulic load application means, an intruding member for impressing the material to be tested, said material being mounted in testing position in said machine with the surface portion to be impressed extending at any angle of inclination to the supporting means on which said material is mounted, a holder having an eccentrical bore carrying said intruding member, a hydraulic press device arranged in said machine, and individually angularly adjustable relative to said material, for actuating said intruding member and moving said member into juxtaposition to said surface portion, said press device including a plunger in the form of a bored differential piston, a microscope associated with said differential piston, the bore of said piston providing the tube for said microscope, and said holder being mounted on said piston by means of said bore for eccentrical rotation relative to said piston through an angular range of 90° for said intruding member to clear the optical axis of said microscope, and pressure fluid control means for actuating said press device for said intruding member to impress said material.

PAUL KRATZER.